UNITED STATES PATENT OFFICE.

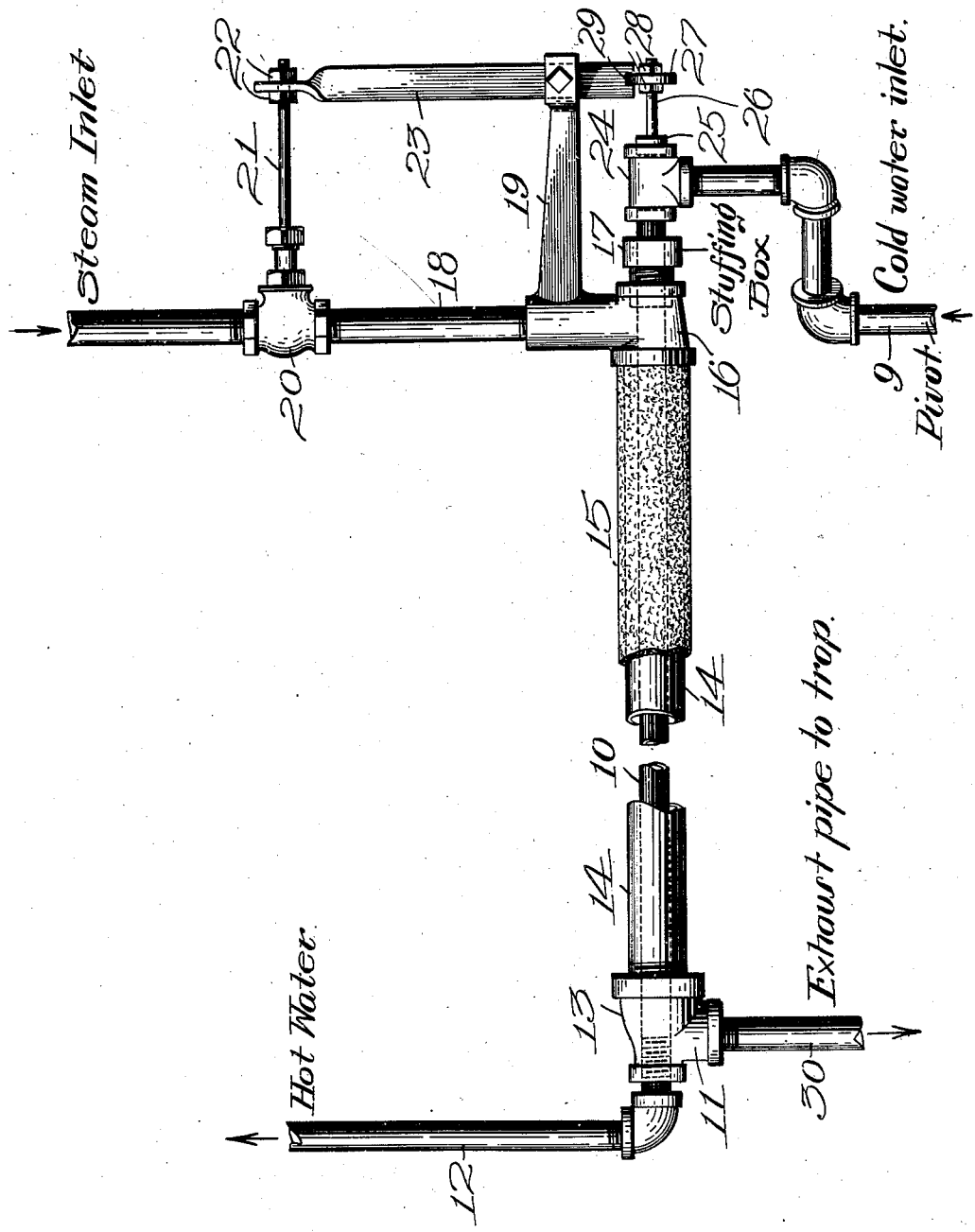

GEORGE C. MADSEN, OF WORCESTER, MASSACHUSETTS, ASSIGNOR OF ONE-HALF TO THOMAS T. SCHOULER, OF WORCESTER, MASSACHUSETTS.

WATER-HEATER.

940,980.   Specification of Letters Patent.   Patented Nov. 23, 1909.

Application filed May 13, 1909. Serial No. 495,625.

*To all whom it may concern:*

Be it known that I, GEORGE C. MADSEN, a citizen of the United States, residing at Worcester, in the county of Worcester and State of Massachusetts, have invented a new and useful Water-Heater, of which the following is a specification.

This invention relates to a water heating device or system, the principal objects thereof being to provide a simple construction of water heating apparatus for heating and domestic purposes of such a character that it will take up very little room, and have a very few parts which are likely to get out of order in use, and which will be very simple to manufacture and keep in order; also to provide a construction in which the water can be heated by steam to any desired degree and automatically kept constantly substantially at a certain temperature without the attention of an operator.

Further objects and advantages of the invention will appear hereinafter.

Reference is to be had to the accompanying drawing, which shows an elevation of a water heating device constructed in accordance with this invention.

The drawing shows a water inlet pipe 9 which is connected with a water pipe 10 preferably straight from end to end. This pipe is fixed at one end in a stationary fitting 11 and has a pipe 12 extending therefrom in any way for the purpose of distributing the hot water. The fitting 11 may be fixed in any desired manner, and is provided with an enlargement 13 which fits the end of a steam heating pipe 14. This pipe is of larger diameter than the pipe 10 so that it can surround the same and leave a space between the two pipes for the circulation of steam or other heating medium. The pipe 14 may conveniently be provided with an asbestos or other jacket 15 for insulating it. At the other end the steam pipe is provided with a fitting 16, through the end of which the pipe 10 extends. This end of the water pipe however is not fixed to the fitting 16, but is free to move therein, and in order to permit this movement a stuffing box 17, of the usual or any desired construction, is provided extending into the fitting and providing for the passage of the end of the pipe 10 therethrough. The fitting 16 is provided with an opening into which a steam inlet pipe 18 enters, and it is also provided with an arm 19. The inlet pipe is provided with a valve 20 having a stem 21 which is adjustably connected by means of nuts 22 or the like with a lever 23 pivoted on the arm 19. Mounted on a T 24 or other connection with which the pipes 9 and 10 are connected is a plug 25 having a rod 26 provided with a disk or plate 27 adjustably mounted thereon by means of nuts 28. This plate extends into a notch 29 in the end of the lever 23 and is designed for operating the latter. The steam is exhausted from the pipe 14 through an exhaust pipe 30 to a trap or the like.

The water pipe 10 preferably is made of a material (as brass or copper) having a greater coefficient of expansion than the iron steam pipe 14.

The operation of the device is as follows:— Water is admitted to the pipe 10 through the pipe 9 and is circulated from the end of the latter through the pipe 12 to the places where the water may be needed. Steam is admitted from the pipe 18 to the pipe 14, and this obviously heats up the water in the pipe 10. As the water is heated up the pipe 10 expands and forces the rod 26 to the right in the position shown in the drawings, the pipe 9 being shown with a vertical section acting as a pivot to permit this motion. This moves the lever 23 so as to tend to close the valve in the valve casing 20. As this valve closes and the flow of steam ceases the pipe 10 will contract and this positively causes the lever to move in the opposite direction so as to open the valve in the steam inlet. In this way the water in the pipe 10 can be kept constantly at any desired temperature by adjusting the nuts 22 and 28 to the proper position.

On account of the water being heated in a brass pipe instead of an iron one the formation of sediment is avoided so that the water pipe does not have to be cleaned out.

It has been found in practice that by using a brass water pipe about 20 feet long and properly regulating the adjustments, hot water can be supplied to a very large building in such a way that whatever the calls for water may be it will always be supplied at a high temperature, and that this is done with an economical use of steam.

While I have illustrated and described a preferred embodiment of the invention, I am aware that many modifications may be made therein without departing from the scope of the invention as expressed in the claims. Therefore I do not wish to be limited to all the details of construction shown and described, but What I do claim is:—

1. In a water heating device, the combination of a water pipe, a steam pipe of larger diameter surrounding the water pipe, a fitting secured to the water pipe and having an enlargement for receiving one end of the steam pipe, a second fitting slidably mounted on the water pipe and having an enlargement for receiving the other end of the steam pipe, a steam inlet pipe connected with the last named fitting, a valve in said steam inlet pipe, and means connecting with the water pipe for automatically operating said valve when the water pipe expands or contracts.

2. In a water heating device, the combination of a water pipe, a steam pipe of larger diameter surrounding the water pipe, a fitting secured to the water pipe and having an enlargement for receiving one end of the steam pipe, a second fitting slidably mounted on the water pipe and having an enlargement for receiving the other end of the steam pipe, said water pipe extending beyond the last named fitting, a movable water inlet connected with said projecting end, a steam inlet pipe connected with the last named fitting, a valve in said steam inlet pipe, and means connecting with the projecting end of the water pipe for automatically operating said valve when the water pipe expands or contracts.

3. In a water heating device, the combination of a fixed fitting, a water pipe fixed to said fitting and projecting therefrom, a steam pipe fixed at one end to said fitting and surrounding the water pipe, a steam inlet pipe connected with the opposite end of said steam pipe, said steam pipe being slidably mounted on the water pipe at that end, the water pipe projecting through the end of the steam pipe, whereby the heat of the steam will cause the water pipe to expand and its projecting end to move, a valve in the steam inlet pipe, and means connected with the projecting end of the water pipe for automatically operating the valve.

4. In a device of the character described, the combination of a water pipe, a steam pipe surrounding the same for a certain distance and having one end stationary, the opposite end of the water pipe projecting from the steam pipe, and being movably connected thereto, the water pipe being of a material having a greater coefficient of expansion than the steam pipe, a steam inlet pipe, a valve therefor, a lever for operating said valve, and means on the projecting end of the water pipe for operating said lever as the water pipe expands and contracts.

5. In a water heating device, the combination of a brass or copper water pipe, an iron steam pipe of larger diameter surrounding the water pipe for a certain distance and having one end stationary, the water pipe being fixed to the stationary end of the steam pipe and the other end of the water pipe being free to move with respect to the steam pipe, a stuffing box for connecting the end of the steam pipe with the movable end of the water pipe, a fitting in which said stuffing box fits, a steam inlet pipe entering said fitting, an arm mounted on said fitting, a valve in the steam inlet pipe, a lever pivoted on said arm and connected with the movable end of the water pipe and with the lever for operating said valve.

In testimony whereof I have hereunto set my hand, in the presence of two subscribing witnesses.

GEORGE C. MADSEN.

Witnesses:
A. E. FAY,
C. F. WESSON.